(12) United States Patent
Mojica (10) Patent No.: US 7,116,506 B1
(45) Date of Patent: Oct. 3, 2006

(54) AUTOMATED DATA STORAGE LIBRARY MAGNETIC TAPE DIAGNOSTIC

(75) Inventor: Arturo Avila Mojica, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/208,307

(22) Filed: Aug. 18, 2005

(51) Int. Cl.
*G11B 15/18* (2006.01)

(52) U.S. Cl. .................................................. 360/71

(58) Field of Classification Search ............... None
See application file for complete search history.

(56) References Cited

U.S. PATENT DOCUMENTS

| | | | | |
|---|---|---|---|---|
| 4,413,328 A | | 11/1983 | Videki, II | 364/900 |
| 4,928,245 A | * | 5/1990 | Moy et al. | 700/218 |
| 5,416,914 A | | 5/1995 | Korngiebel et al. | 395/425 |
| 5,872,672 A | * | 2/1999 | Chliwnyj et al. | 360/77.12 |
| 6,023,709 A | | 2/2000 | Anglin et al. | 707/204 |
| 6,198,594 B1 | | 3/2001 | Utsumi et al. | 360/92 |
| 6,725,394 B1 | | 4/2004 | Bolt | 714/7 |
| 6,738,210 B1 | | 5/2004 | Olson et al. | 360/53 |
| 6,741,182 B1 | | 5/2004 | Smith et al. | 340/664 |
| 2004/0153773 A1 | | 8/2004 | Woo et al. | 714/25 |

FOREIGN PATENT DOCUMENTS

| | | |
|---|---|---|
| EP | 1462928 | 9/2004 |
| JP | 3071467 A | 3/1991 |
| JP | 6251475 A | 9/1994 |
| JP | 2000048439 A | 2/2000 |
| JP | 2003297005 A | 10/2003 |

\* cited by examiner

*Primary Examiner*—K. Wong
(74) *Attorney, Agent, or Firm*—John H. Holcombe (57) ABSTRACT

Diagnostic information is provided in an automated data storage library which stores magnetic tape data storage cartridges. Uninitialized magnetic tape data storage cartridges are identified; a diagnostic scan is conducted by a drive of the library of the servo tracks on magnetic tape of an identified cartridge using write criteria for a diagnostic test; the results of the diagnostic test are logged by the drive; and the logged results of the diagnostic test are collected at the library controller.

18 Claims, 6 Drawing Sheets

FIG. 7 ically in

AUTOMATED DATA STORAGE LIBRARY MAGNETIC TAPE DIAGNOSTIC

DOCUMENT INCORPORATED BY REFERENCE

Commonly assigned U.S. patent application Ser. No. 10/668,695, filed Sep. 23, 2003, is incorporated for its showing of an automated data storage library.

Commonly assigned U.S. patent application Ser. No. 11/208,484, filed on the same date as the present application, is incorporated for its showing of scanning servo tracks of a magnetic tape data storage cartridge in write mode without writing data and detecting servo errors using criteria of the write mode.

FIELD OF THE INVENTION

This invention relates to automated data storage libraries, and, more particularly, to the reliability, availability and serviceability of such libraries.

BACKGROUND OF THE INVENTION

Automated data storage libraries provide a means for storing large quantities of data in removable data storage media, such as magnetic tape data storage cartridges, that are not permanently mounted on data storage drives, and that are stored in a readily available manner on storage shelves.

Data is written to a magnetic tape data storage cartridge by a magnetic tape data storage drive, and the cartridge is typically removed from the drive and stored in a storage shelf of the automated data storage library and at some subsequent time is accessed from the storage shelf to be read by the same or another magnetic tape data storage drive of the library. Should an application or applications not cycle through multiple drives, for example, all jobs start on the same drive, and if that drive is busy try the next, errors in the data transfer process, for example, from defective cartridges, will be concentrated in the first drive. Thus, the assumption may be made that the problem lies with the magnetic tape data storage drive, resulting in the replacement of the drive, with accompanying warranty expense by the drive supplier, and may result in replaced and returned drives having "no defect found". One approach is to interrupt the application experiencing data errors, to move cartridges that have evidenced errors from drive to drive, and test the cartridges in another drive. This approach is not necessarily appreciated by the user of the library and cartridges.

SUMMARY OF THE INVENTION

An automated data storage library, service methods, computer program products, and systems are provided for providing diagnostic information regarding magnetic tape. An automated data storage library comprises a plurality of storage shelves configured to store magnetic tape data storage cartridges; robot accessor(s) configured to transport the magnetic tape data storage cartridges; at least one cartridge label sensor; and a plurality of magnetic tape data storage drives configured to read and write data with respect to magnetic tape data storage cartridges, and configured to detect and track follow servo tracks on magnetic tape. At least one library controller is configured to operate the robot accessor(s) to transport the magnetic tape data storage cartridges, and to operate the cartridge label sensor(s) to read labels of magnetic tape data storage cartridges.

An embodiment of a method in accordance with the present invention comprises identifying uninitialized magnetic tape data storage cartridges; conducting a diagnostic test of the servo tracks on magnetic tape of the identified magnetic tape data storage cartridge using write criteria for the diagnostic test; logging the results of the diagnostic test employing information read from the cartridge label to identify the tested cartridge; and collecting the logged results of the diagnostic test at the library controller.

In a further embodiment, a comprehensive history of the results of diagnostic tests using write criteria is maintained for a plurality of the identified magnetic tape data storage cartridges.

In a still further embodiment, information from the maintained comprehensive history is gathered, and the gathered information is provided for analysis.

In another embodiment of the invention, wherein a processor is additionally configured to provide an inventory of magnetic tape data storage cartridges, identifying active cartridges and a scratch pool, and to identify cartridges that are input into the library; the method additionally comprises operating the robot accessor(s) to provide the input cartridges to the magnetic tape data storage drive(s) to initiate the diagnostic test of an uninitialized magnetic tape data storage cartridge before the magnetic tape data storage cartridge is added to the inventory scratch pool.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
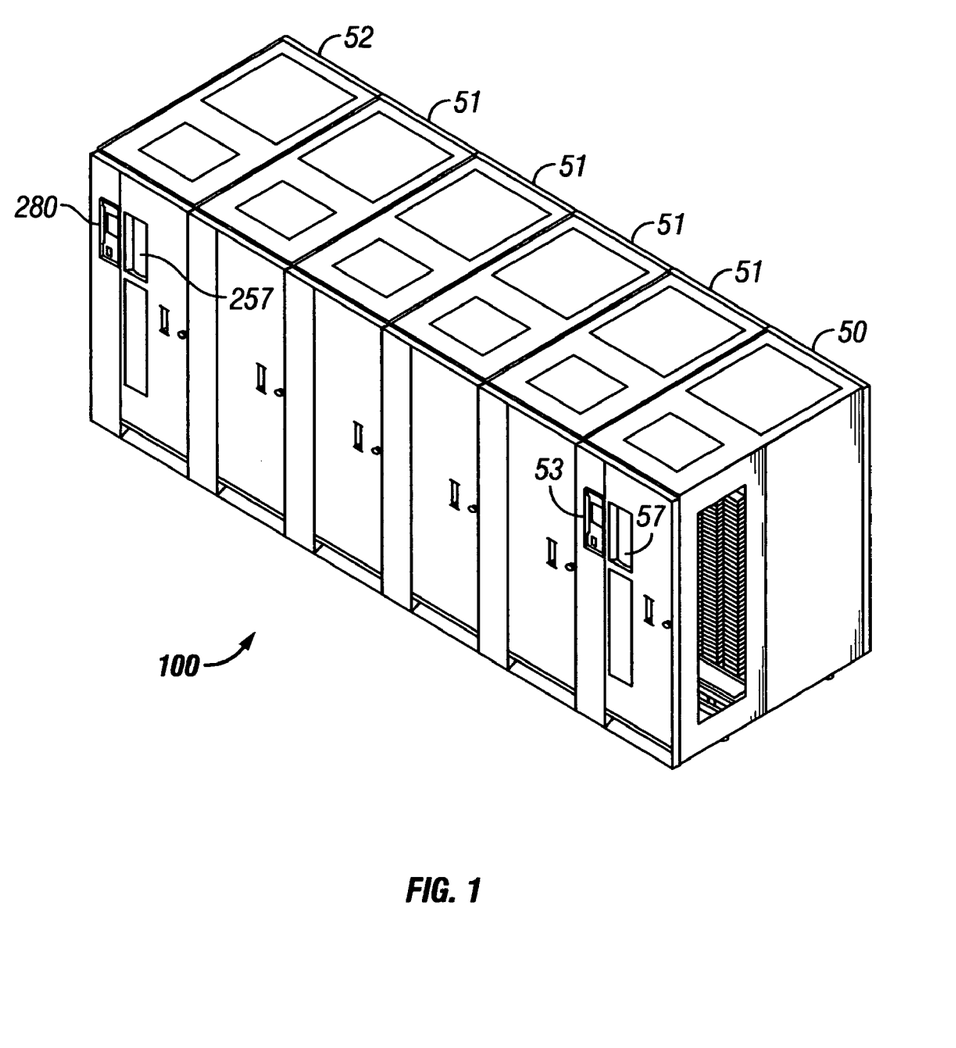
FIG. 1 is an isometric illustration of an automated data storage library which may implement the present invention.
Figure 2:
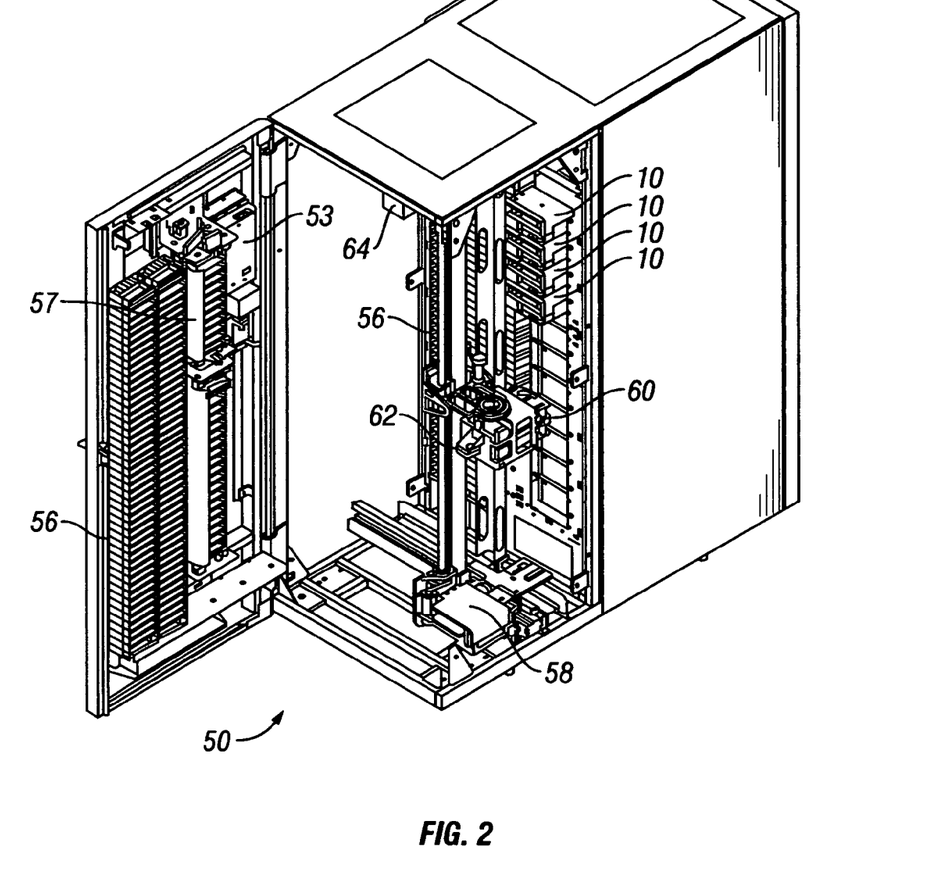
FIG. 2 is an illustration view of an opened frame of the automated data storage library of FIG. 1.
Figure 3:
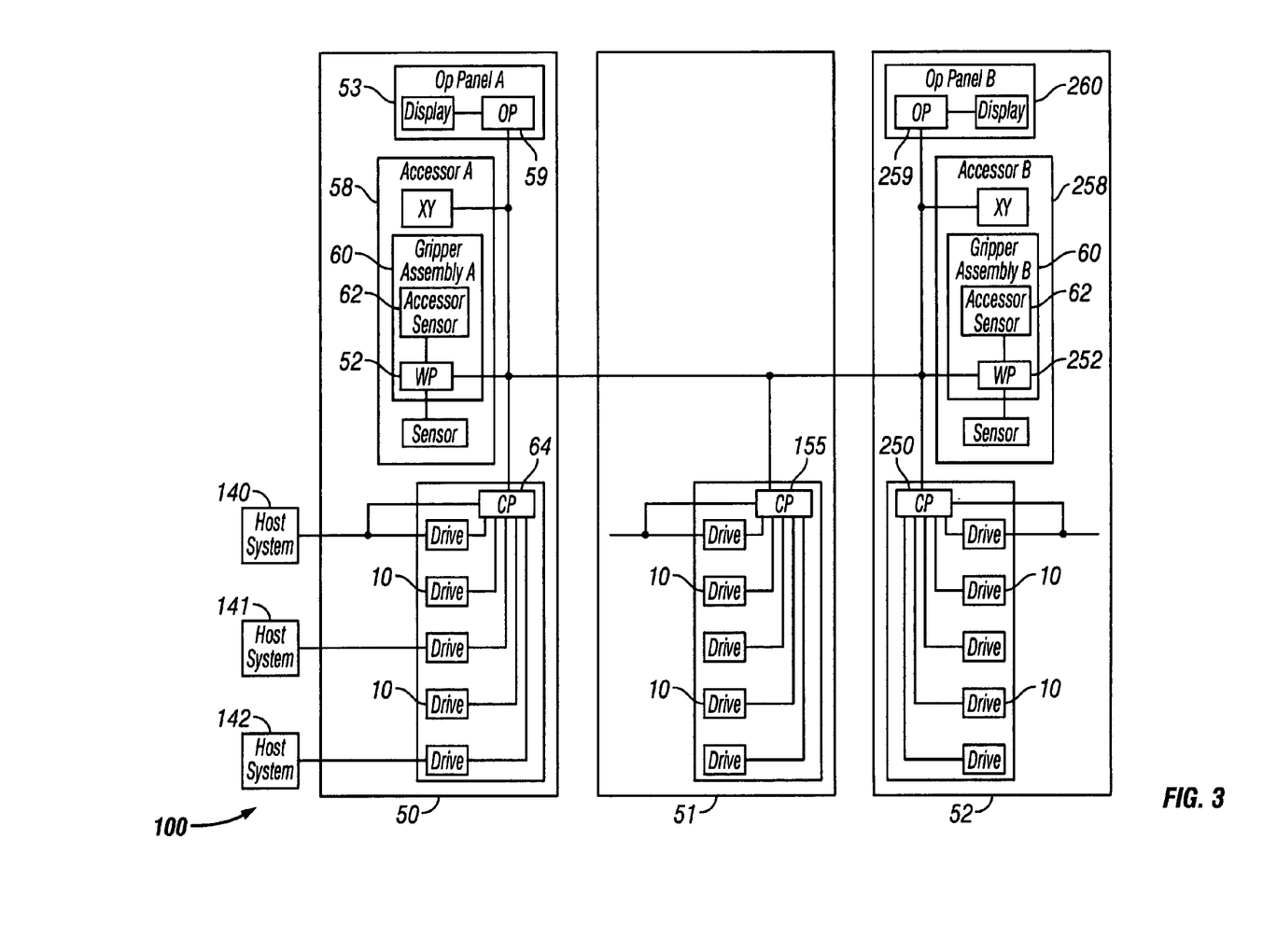
FIG. 3 is a block diagram of an embodiment of the automated data storage library of FIGS. 1 and 2.

FIGS. 1, 2 and 3 illustrate an embodiment of an automated data storage library 100, configured in accordance with the present invention, which is arranged to access data storage media, such as magnetic tape cartridges, typically in response to commands from at least one external host system, and comprises one or more frames 50, 51, 52, each of which has a plurality of storage shelves 56 for storing the magnetic tape cartridges, and may have a plurality of magnetic tape data storage drives 10 for reading and/or writing data with respect to the magnetic tape cartridges. The library 100 further comprises at least one robot accessor 58, 258 for transporting the magnetic tape cartridges between the storage shelves 56 and the magnetic tape data storage drives 10. The robot accessor 58, 258 comprises a gripper assembly 60 for gripping one or more magnetic tape cartridges, and comprises an accessor sensor 62, such as an LED (Light Emitting Diode) emitter/detector, a bar code scanner, or reading system to read the labels of the magnetic tape cartridges or about the library.

The library 100 also comprises one or more control processors 64, 52, 59, 155, 250, 252, 259, to operate the library, communicate with a host system 140 or host systems, and communicate with the magnetic tape data storage drives 10. Alternatively, the magnetic tape data storage drives 10 may communicate with a host system or systems 141, 142, directly, and the library to host system or systems communication may be through the tape drive communication. Further, the library may provide one or more operator panels 53, 280 for communicating with the library controller. The library controller may be set up as a centralized control system, or as a distributed control system. An example of an automated data storage library comprises the IBM® 3584 tape library, and another example of an automated data storage library comprises the IBM® 3594 tape library. An automated data storage library is further described in the incorporated U.S. patent application Ser. No. 10/668,695.

A controller, such as a library controller, typically comprises logic and/or one or more microprocessors with memory for storing information and program information for operating the microprocessor(s). Herein "processor" may comprise any suitable logic, microprocessor, and associated memory for responding to program instructions, and the associated memory may comprise fixed or rewritable memory or data storage devices. The program information may be supplied to the library controller or memory from a host 140, via a data storage drive 10, by an input from a floppy or optical disk, or by being read from a magnetic tape cartridge, or by any other suitable means.

Magnetic tape data storage cartridges may be added to or removed from the library, for example, at input/output stations 57, 257. Typically, cartridges that have been unused for some period of time are removed from the library and may be archived. New, uninitialized cartridges are added to the library to store new data. The input/output stations typically provide a signal to indicate that a cartridge or cartridges are input into the library.

An inventory is typically maintained by either the library, e.g. at one or more of the processors, or for the library by a host. Herein, the processor(s) of the library or of the host that maintain the inventory is called a "processor". The inventory is of magnetic tape data storage cartridges, identifying active cartridges and a scratch pool, and often substantial information regarding the cartridges, including the current locations of the cartridges.

As discussed above, an error detected in reading or writing a magnetic tape cartridge may result from a defect in the magnetic tape or the magnetic tape data storage drive. An application or applications of an automated data storage library 100 of FIG. 4, or any application using multiple drives outside of a library, may not cycle through multiple drives 10. For example, all jobs start on the same drive, and if that drive is busy try the next. In that case, errors in the data transfer process, for example, from defective cartridges, will be concentrated in the first drive. Thus, the assumption may be made that the problem lies with the magnetic tape data storage drive, resulting in the replacement of the drive, and warranty expense by the drive supplier, and may result in replaced and returned drives having "no defect found".

Figure 4:
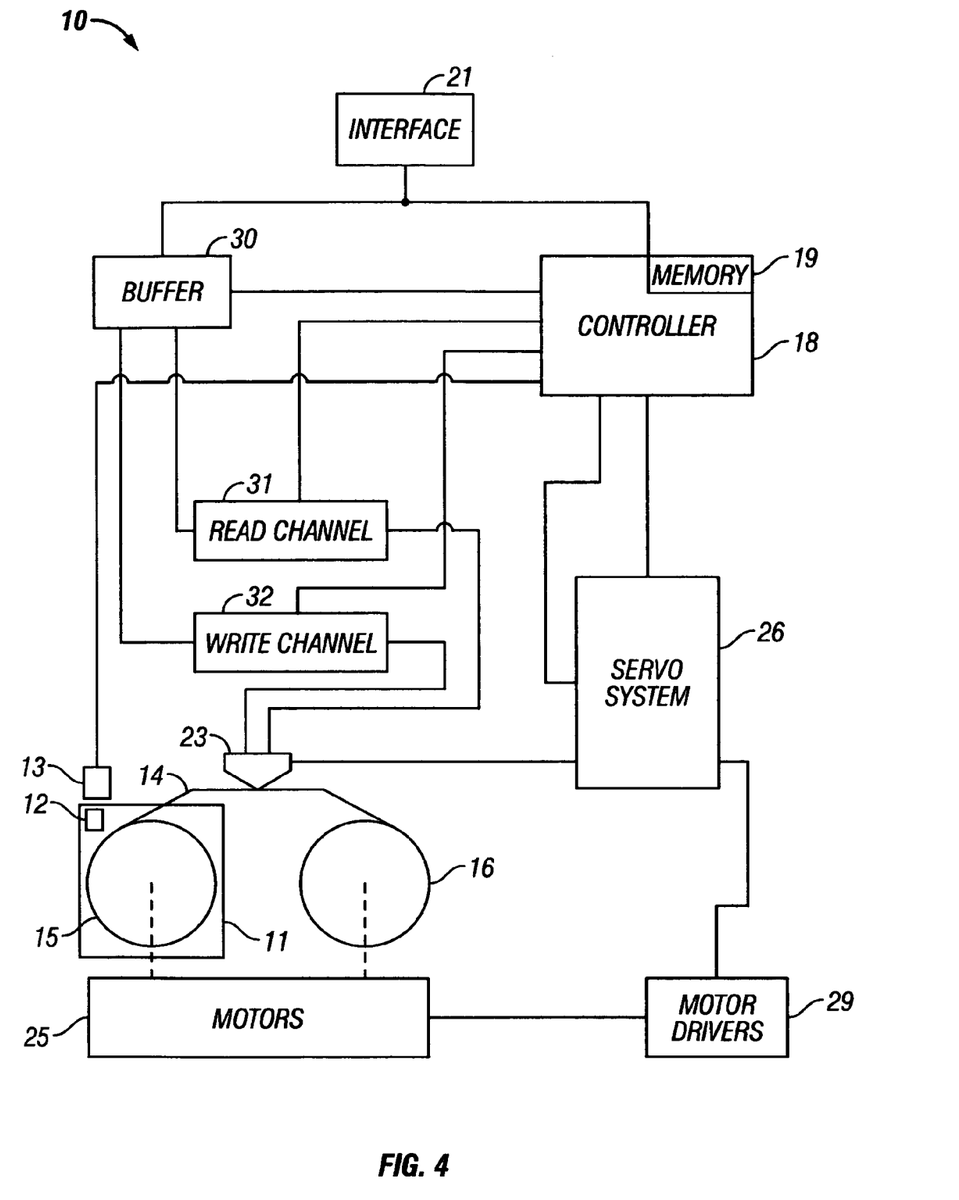
FIG. 4 is a block diagram of an embodiment of one of a plurality of magnetic tape data storage drives of the automated data storage library of FIGS. 2 and 3.

Referring to FIG. 4, a magnetic tape data storage drive 10 is illustrated, and provides a means for reading and writing information with respect to a magnetic tape 14 of a magnetic tape data storage cartridge 11.

Magnetic tape data storage cartridges provide a means to store data on magnetic tape to be saved and read at a subsequent time. Further, the magnetic tape data storage cartridges may be interchanged between tape drives, such that a magnetic tape written on one tape drive will be read by another tape drive.

As is understood by those of skill in the art, a magnetic tape data storage cartridge 11 comprises a length of magnetic tape 14 wound on one or two reels 15, 16.

A single reel magnetic tape data storage cartridge 11 is illustrated, example of which are those adhering to the Linear Tape Open (LTO) format. An example of a magnetic tape data storage drive 10 is the IBM® 3580 Ultrium magnetic tape drive based on LTO technology. A further example of a single reel magnetic tape data storage drive and associated cartridge is the IBM® 3592 TotalStorage Enterprise magnetic tape drive and associated magnetic tape cartridge. An example of a dual reel cartridge is the IBM® 3570 magnetic tape cartridge and associated drive.

Also as is understood by those of skill in the art, a magnetic tape data storage drive 10 comprises one or more drive controllers 18 of a recording system for operating the magnetic tape drive in accordance with commands received at interface 21. A drive controller typically comprises logic and/or one or more microprocessors with a memory 19 for storing information and program information for operating the microprocessor(s). The program information may be supplied to the drive controller or memory via the interface 21 from a host or from the library, by an input from a floppy or optical disk, or by being read from a magnetic tape cartridge, or by any other suitable means. The magnetic tape data storage drive 10 may comprise a standalone unit or comprise a part of an automated data storage library or other subsystem. The interface 21 may comprise a Small Computer System Interface (SCSI), an optical fiber channel interface, etc.

The magnetic tape data storage cartridge 11 may be inserted in the magnetic tape data storage drive 10, and loaded by the tape drive so that one or more read and/or write tape heads 23 of the recording system reads and/or writes information in the form of signals with respect to the magnetic tape 14 as the tape is moved longitudinally by one or more motors 25 which rotate the reels 15, 16.

The magnetic tape data storage cartridge 11 may also comprise a cartridge memory 12 which stores information about the cartridge, for example, whether the cartridge has been initialized, factory information about the cartridge, and housekeeping information. The magnetic tape data storage drive communicates with cartridge memory 12 by means of a wireless communication interface 13, to read and/or write information with respect to the cartridge memory, and further communicates with the drive controller 18.

Figure 5:
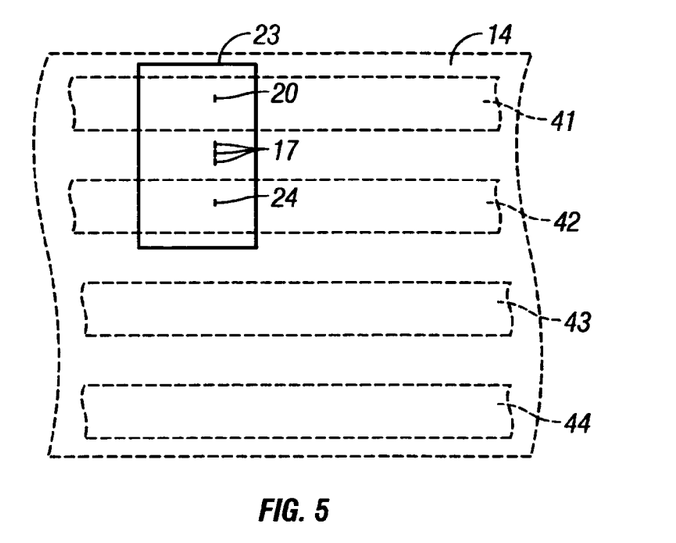
FIG. 5 is a diagrammatic illustration of a magnetic tape head of the magnetic tape data storage drive of FIG. 4 and of a segment of a magnetic tape with a plurality of servo tracks.

Referring additionally to FIG. 5, the magnetic tape 14 typically comprises a plurality of parallel tracks, or groups of tracks, separated by longitudinal servo tracks 41, 42, 43, and 44. In some formats, such as the LTO format, above, the tracks are arranged in a serpentine back and forth pattern of separate wraps, as is known to those of skill in the art. The tape head 23 typically comprises a number of separate elements which read and/or write data with respect to a number of parallel data tracks, as is provided with a separate servo transducer, or servo transducers 20, 22, which are laterally offset from the read and/or write elements 17, so that, as the servo transducers track follow the servo track, the read and/or write elements 17 are guided along the data track or tracks.

A servo system 26 of the magnetic tape data storage drive 10 of FIG. 4 moves the tape head 23 laterally with respect to the magnetic tape 14 both to access a track or group of tracks and to track follow the servo track to cause the read and/or write elements 17 to maintain alignment with the accessed data track or tracks. Also as known to those of skill in the art, a group of tracks may be called a "wrap" and the servo system may comprise a wrap control system to move the tape head 23 laterally to access a wrap, for example at BOT and EOT, and the servo system may also control the operation of the motors 25 through motor drivers 29, both in response to instructions by the drive controller 18.

Drive controller 18 also provides the data flow and formatter for data to be read from and written to the magnetic tape, employing a buffer 30, a read channel 31, and a write channel 32, as is known to those of skill in the art.

Figure 6:
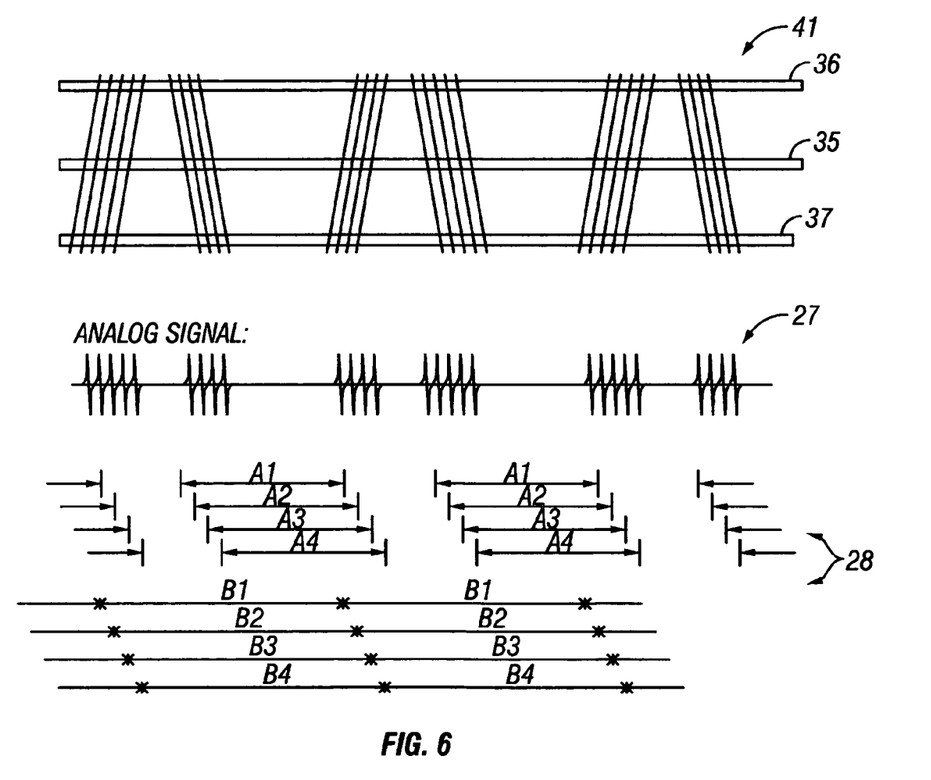
FIG. 6 is a representation of a servo transducer as it tracks one of the servo tracks of FIG. 5, along with a representation of the servo output signal it generates and the corresponding signal intervals.

Referring additionally to FIG. 6, the drive system comprising at least motors 25, motor drivers 29, and reels 15, 16 moves a magnetic tape 14 longitudinally with respect to the tape head 23 such that the servo transducer 20 will trace a path 35 as the servo transducer tracks one of the servo tracks of FIG. 5, e.g. servo track 41. The exemplary servo track illustrated in FIG. 6 is of the type described in U.S. Pat. No. 5,689,384, which comprises patterns of transitions recorded at more than one azimuthal orientation across the width of the servo track, and which are therefore non-parallel. The timing 28 of the signal 27 derived from reading at any point across the width of such a pattern varies continuously as the servo transducer 20 is moved laterally across the servo track, since the servo transducer 20 is small compared to the width of the servo pattern. Lateral position sensing is achieved by deriving a ratio of two servo pattern intervals A and B of FIG. 6 and therefore is insensitive to tape speed.

A servo system may provide the ability to seek and track follow separate servo tracking positions. For example, in FIG. 6, path 35 represents one of several separate servo tracking positions, and path 36 represents the top-most of the separate servo tracking positions, and path 37 represents the bottom-most servo tracking position.

Information may also be encoded into the servo information, as is known to those of skill in the art, such as longitudinal positioning information.

The servo system 26 may alternatively comprise any suitable alternative system for providing a lateral track following capability, as are known to those of skill in the art, such as amplitude based systems.

Any offset from the desired position of the servo transducer 20 is called a positioning error and the servo signal of this offset is called a Positioning Error Signal (PES). The servo system thus attempts to drive the PES to a desired value, and thereby accurately track follow the servo track. Servo tracks may implement several servo tracking positions across a single servo track.

As pointed out in the incorporated U.S. patent application Ser. No. 11/208,484, typically, errors in track following are treated differently between the read channel 31 and the write channel 32, since a read action does not affect the data present on the magnetic tape 14, while a write operation that goes off-track runs the risk of overwriting existing data on adjacent tracks. Thus, the criteria for flagging a servo error in a write operation is more critical than the criteria used in a read operation, and the magnetic tape drive may be configured to detect servo errors which are significant enough to risk overwriting adjacent tracks, such as servo signals which are discontinuous or not correctly read, and therefore cause the magnetic tape data storage drive to stop writing. Such servo errors may result from defects in the magnetic tape, from a poor signal by the servo transducer, or from other causes with the drive or with the magnetic tape, as are understood by those of skill in the art. Examples of servo errors comprise low amplitude servo signals, positioning error signals (PES) which are outside expected parameters, longitudinal positioning (LPOS) errors that are not read or are outside expected parameters, etc. In write mode, the errors may be sufficiently significant to cause the magnetic tape data storage drive to stop writing.

Referring to FIGS. 1, 2, 3, 4 and 7, an embodiment of a method in accordance with the present invention is initiated at step 160, for example, each time a magnetic tape cartridge 11 is loaded into an input/output station 57, 257. Cartridges supplied to the library at the input/output stations may comprise new, unititialized cartridges, may comprise previously archived cartridges, or may comprise cartridges that are being transferred from other libraries or other sources.

Figure 7:
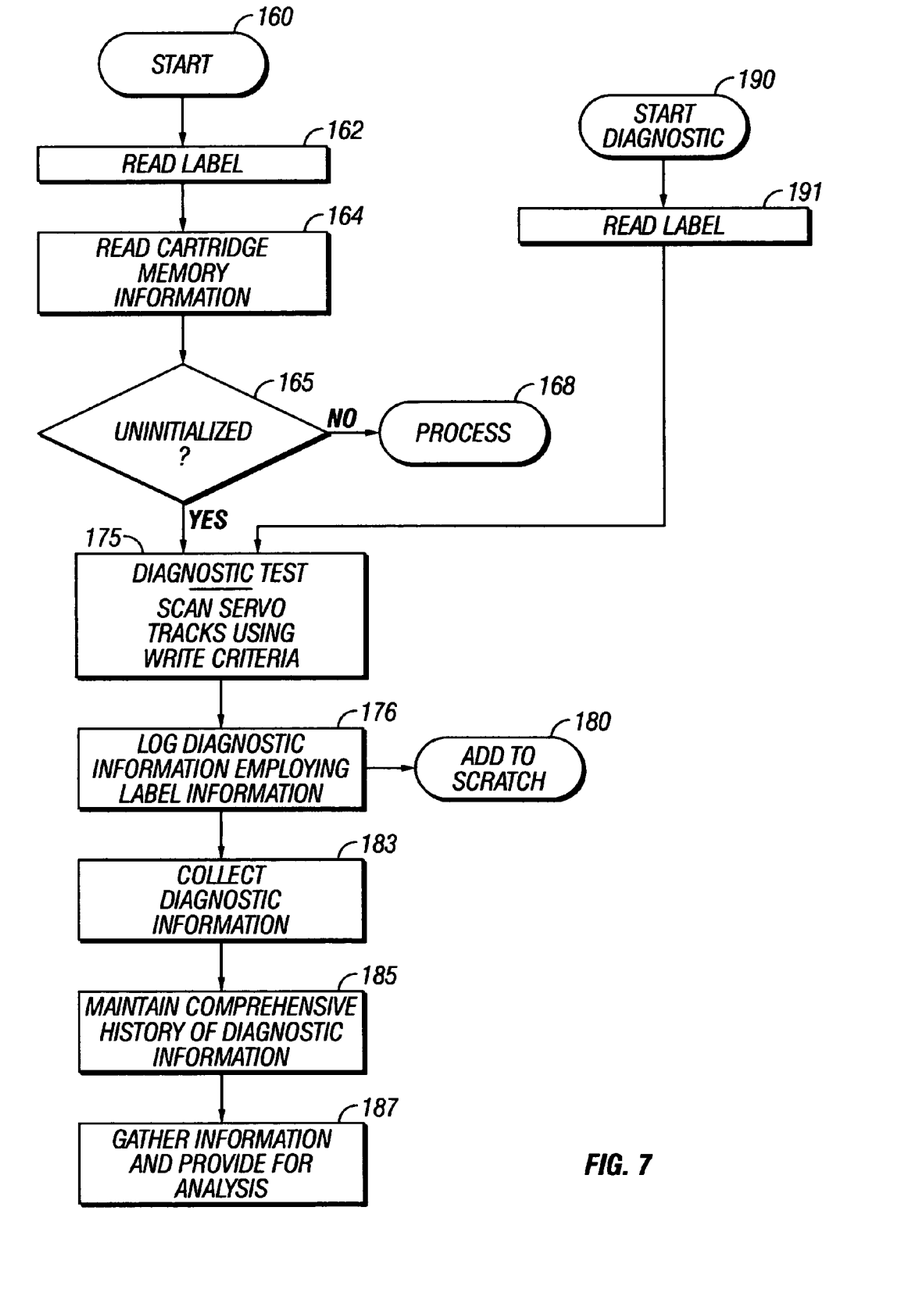
FIG. 7 is a flow chart depicting embodiments of methods in accordance with the present invention.

The automated data storage library, in step 162, moves the robot accessor 58 or robot accessor 258 to the input/output station and operates the label sensor 62 to read the label of a cartridge received at the input/output station. The cartridge identified in the label may comprise a cartridge for which a command has been received to move the cartridge to a drive, shelf or station, and the library will do so. If the cartridge may comprise an "uninitialized" cartridge, the library operates the robot accessor 58, 258 to load the cartridge in a magnetic tape data storage drive 10 to determine whether it has been initialized. An initialized cartridge will have some specific information provided in the cartridge memory 12 and/or recorded at the beginning of tape (BOT), as is known to those of skill in the art.

The magnetic tape data storage drive 10, in step 164, reads the cartridge information, either from the cartridge memory 12 with the wireless communication interface 13, or from the information at the BOT, and, in step 165, identifies whether the magnetic tape data storage cartridge is uninitialized. If the magnetic tape data storage cartridge was initialized, the cartridge is processed normally in step 168.

If the magnetic tape data storage cartridge is uninitialized, a diagnostic scan using write criteria is made in step 175, employing the process of the incorporated U.S. patent application Ser. No. 11/208,484. The cartridge may also be initialized by the drive at this time.

To perform a diagnostic scan using write criteria, referring to FIG. 4, the drive controller 18 selects a write mode for the magnetic tape drive, which is nominally to operate the write channel 32 and the servo system 26 to write data while the track following servo apparatus detects and track follows the servo tracks of a magnetic tape 14. However, drive controller 18 deactivates the write operation, such that the magnetic tape data storage drive is configured to not write the data tracks even though it is in write mode. For example, the "write enable" signal is disabled, and data verification ("ECC checking") is turned off. Alternatively, the process may comprise a single step of selecting a special non-writing mode while retaining the servo error detection characteristics in a write mode.

Thus, the media and servo parameters are set to the actual used for write operations.

The drive controller operates the magnetic tape data storage drive to scan the servo tracks of a magnetic tape in the write mode without writing data. In this mode, the track following servo apparatus 26 detects and track follows the servo tracks of a magnetic tape 14, and detects servo errors using criteria of the write mode. The write mode criteria typically are tougher than the read criteria. The write criteria may have several components, and one of them is for the Positioning Error Signal (PES). Whenever a PES error occurs, the drive needs to stop writing in order to avoid overwriting adjacent tracks, as discussed above, and to skip some distance forward, or conduct one or more error recovery procedures (ERP) and attempt to write the data again. A typical PES error comprises a servo signal discontinuity, and may result from embossments, signal drop outs, creases, z-folds, or edge damage, many of which can be identified from error recovery procedures. Additional write mode criteria may be practiced by those of skill in the art.

In one embodiment, a determination is made whether a detected servo error or detected servo errors are sufficiently significant that the system would, if the write channel 32 were writing data, writing would be stopped. An example is a PES error discussed above, where the write channel would stop writing due to the risk of overwriting adjacent tracks. If the servo error is sufficiently significant, in step 176 of FIG. 7, the servo error is logged. Alternatively, all servo errors may be logged in step 176, in one embodiment with a flag or other indication of the type or importance to the logged servo errors. The scan may comprise up to all the servo tracks and one or more servo tracking positions of the servo track, for example such that both the top-most 36 and bottom-most 37 servo tracking position of FIG. 6 in each track is scanned.

Herein, such logged errors are termed "servo errors", and an accumulation of servo errors or a lack thereof is termed "diagnostic information".

The servo errors are logged, in step 176, for example, in the memory 19 of the drive controller 18 of FIG. 4. In an embodiment of the present invention, information read from the cartridge label in step 162 is employed to identify the logged diagnostic information as that of the tested cartridge. The initialization or initial use of a magnetic tape cartridge may be called "Time Zero" (T0), and the diagnostic information may be called the T0 diagnostic information. In addition, the diagnostic information of logged servo errors, or a version of the logged servo errors, may be written to an area of the magnetic tape data storage cartridge 11, for example, which has been set aside for non-data "housekeeping" information on the magnetic tape. Thus, the T0 diagnostic information regarding that cartridge can be maintained in the cartridge, and made available in case the diagnostic servo history of the cartridge is reviewed in the future. For example, subsequent drives may read the housekeeping T0 diagnostic information and provide it in a dump operation if a failure occurs and use it for the purpose of failure analysis. In addition, or alternatively, the housekeeping information may be provided by the wireless interface 13 to the cartridge memory 12, and maintained in the cartridge.

Still further, the cartridge may subsequently be scanned and the new diagnostic information compared to the T0 information. For example, a criteria may be established by a host or library application to identify a magnetic tape data storage cartridge to be retested, for example, a cartridge having a higher than normal data error rate, either read errors, or write errors that are detected by the read after write data verification, as are known to those of skill in the art. Such cartridges may be tested again, beginning at step 190 of FIG. 7. In step 191, the automated data storage library operates the label sensor 62 of FIG. 3 to read the label of the identified cartridge, and operates the robot accessor 58 or robot accessor 258 to move the cartridge to a drive, the drive loads the cartridge and conducts a servo scan diagnostic test of step 175 of FIG. 7 using write criteria, as discussed above. The diagnostic information resulting from the test is logged in step 176, collected in step 183, and added to the comprehensive history in step 185.

In step 187, diagnostic information from the comprehensive history may be analyzed to determine the trend of the quality of the cartridge.

"Housekeeping" information may be maintained in an area of the magnetic tape that has been set outside the customer use region and is for vendor specific use, for example, an area that contains no customer data and are not defined as available for data interchange. However, the area is typically encoded so as to be readable by library magnetic tape data storage drives. Thus, the drives and library may share the housekeeping information.

In accordance with an embodiment of the present invention, the input cartridges are provided to the magnetic tape data storage drive(s) to initiate the diagnostic test of an uninitialized magnetic tape data storage cartridge before the magnetic tape data storage cartridge is added to the inventory scratch pool, and, upon completion of the diagnostic test in steps 175 and 176, the magnetic tape data storage cartridge, in step 180, is added to the scratch pool.

In step 183, the diagnostic information of logged servo errors, or a version of the logged servo errors, are collected by the automated data storage library 100 of FIG. 3, for example, over interface 21 of the drive 10 of FIG. 4, and communicated to the library, for example, to library controller 64. In this manner, the library 100 can track the diagnostic information for each of the drives 10, and/or for each of the cartridges. In one embodiment, the logged servo errors for each input cartridge are collected individually as the cartridge is tested. In another embodiment, the drive logs the servo errors for a plurality of tested cartridges and the library collects a set of data occasionally, for example, periodically, in step 183 of FIG. 7.

In a further embodiment of step 185, a comprehensive history of the results of diagnostic tests using the write criteria is maintained for a plurality of the identified magnetic tape data storage cartridges by the automated data storage library. The comprehensive history comprises the T0 diagnostic information discussed above, and may comprise diagnostic information of any subsequent error handling. Additionally, step 175 may be repeated for subsequent scans of the cartridge using the write criteria. A cartridge that has been actively used will likely have data recorded thereon, and, hence, in addition to the servo scan diagnostic test in step 175, the read after write read back error threshold, discussed above, will yield useful diagnostic information.

In a still further embodiment of step 187, information from the maintained comprehensive history is gathered, and the gathered information is provided for analysis. For example, if the comprehensive history includes all tested errors, the gathered information may comprise only the significant servo errors, as discussed above, or may select one type of diagnostic information. For example, only the servo scan information, or only the read back error information, may be gathered.

The method of the present invention comprises a service of providing diagnostic information, and may be implemented in any suitable form, one of which comprises a computer program product that is provided to a programmable computer processor, such as drive controller 18 of FIG. 4 and the library controller. The computer program product may comprise firmware of a PROM, may be stored in memory, and/or provided to the automated data storage library from a host system at interface 21, from a magnetic tape cartridge, or by other means.

Those of skill in the art will understand that changes may be made with respect to the ordering of the steps of FIG. 7. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An automated data storage library comprising:
   a plurality of storage shelves configured to store magnetic tape data storage cartridges;
   at least one robot accessor configured to transport said magnetic tape data storage cartridges;
   at least one cartridge label sensor;
   at least one library controller configured to operate said at least one robot accessor to transport said magnetic tape data storage cartridges, and to operate said at least one cartridge label sensor to read a label of a magnetic tape data storage cartridge; and
   a plurality of magnetic tape data storage drives configured to detect and track follow servo tracks on magnetic tape; and configured to read and write data with respect to magnetic tape data storage cartridges;
   wherein said at least one magnetic tape data storage drive is additionally configured to A) identify an uninitialized magnetic tape data storage cartridge; B) conduct a diagnostic test of said servo tracks on magnetic tape of said identified magnetic tape data storage cartridge using write criteria for said diagnostic test; C) log diagnostic information resulting from said diagnostic test employing information read from said label to identify said diagnostic information as that of said magnetic tape data storage cartridge; and D) provide said logged diagnostic information to said at least one library controller.

2. The automated data storage library of claim 1, wherein said at least one magnetic tape data storage drive is additionally configured to maintain a comprehensive history of diagnostic information resulting from diagnostic tests using write criteria, for a plurality of said identified uninitialized magnetic tape data storage cartridges.

3. The automated data storage library of claim 2, wherein said at least one library controller is additionally configured to collect said comprehensive histories as maintained by said plurality of magnetic tape data storage drives.

4. The automated data storage library of claim 3, wherein said at least one library controller is additionally configured to gather information from said collected histories and to provide said gathered information for analysis.

5. The automated data storage library of claim 1, wherein a processor is configured to provide an inventory of magnetic tape data storage cartridges, identifying active cartridges and a scratch pool, and to identify cartridges that are input into said library; and is further configured to operate said at least one robot accessor to provide said input cartridges to said at least one magnetic tape data storage drive to initiate said diagnostic test of an uninitialized magnetic tape data storage cartridge before said magnetic tape data storage cartridge is added to said inventory scratch pool.

6. A system configured to provide diagnostic information regarding magnetic tape in an automated data storage library, said automated data storage library comprising a plurality of storage shelves configured to store magnetic tape data storage cartridges; at least one robot accessor configured to transport said magnetic tape data storage cartridges; at least one cartridge label sensor; and a plurality of magnetic tape data storage drives configured to read and write data with respect to magnetic tape data storage cartridges, and configured to detect and track follow servo tracks on magnetic tape; said system comprising:
   at least one library controller configured to operate said at least one robot accessor to transport said magnetic tape data storage cartridges, and configured to operate said at least one cartridge label sensor to read a label of an identified input magnetic tape data storage cartridge; and
   a drive controller of said at least one magnetic tape data storage drive configured to A) identify an uninitialized magnetic tape data storage cartridge; B) conduct a diagnostic test of said servo tracks on magnetic tape of said identified magnetic tape data storage cartridge using write criteria for said diagnostic test; C) log diagnostic information resulting from said diagnostic test employing information read from said label to identify said diagnostic information as that of said magnetic tape data storage cartridge; and D) provide said logged to said at least one library controller.

7. The system of claim 6, wherein said drive controller is additionally configured to maintain a comprehensive history of diagnostic information resulting from diagnostic tests using write criteria, for a plurality of said identified input magnetic tape data storage cartridges.

8. The system of claim 7, additionally comprising a plurality of said drive controllers, at least one of said drive controllers associated with each of said plurality of magnetic tape data storage drives; and wherein said at least one library controller is additionally configured to collect said comprehensive histories as maintained by drive controllers of said plurality of magnetic tape data storage drives.

9. The system of claim 8, wherein said at least one library controller is additionally configured to gather information from said collected histories and to provide said gathered information for analysis.

10. The system of claim 6, wherein a processor is configured to provide an inventory of magnetic tape data storage cartridges, identifying active cartridges and a scratch pool, and to identify cartridges that are input into said library; and is further configured to operate said at least one robot accessor to provide said input cartridges to said at least one magnetic tape data storage drive to initiate said diagnostic test of an uninitialized magnetic tape data storage cartridge before said magnetic tape data storage cartridge is added to said inventory scratch pool.

11. A method of providing a service of providing diagnostic information regarding magnetic tape in an automated data storage library, said automated data storage library comprising a plurality of storage shelves configured to store magnetic tape data storage cartridges; at least one robot accessor configured to transport said magnetic tape data storage cartridges; at least one cartridge label sensor; and a plurality of magnetic tape data storage drives configured to read and write data with respect to magnetic tape data storage cartridges, and configured to detect and track follow servo tracks on magnetic tape; and at least one library controller configured to operate said at least one robot accessor to transport said magnetic tape data storage cartridges, and to operate said at least one cartridge label sensor to read labels of magnetic tape data storage cartridges; said method comprising the steps of:

identifying uninitialized magnetic tape data storage cartridges;

conducting a diagnostic test of said servo tracks on magnetic tape of said identified magnetic tape data storage cartridge using write criteria for said diagnostic test;

logging diagnostic information resulting from said diagnostic test employing information read from said label to identify said diagnostic information as that of said magnetic tape data storage cartridge; and     collecting said logged diagnostic information resulting from said diagnostic test at said at least one library controller.

12. The method of claim 11, additionally comprising the step of maintaining a comprehensive history of diagnostic information resulting from diagnostic tests using write criteria, for a plurality of said identified magnetic tape data storage cartridges.

13. The method of claim 12, additionally comprising the steps of gathering information from said maintained comprehensive history; and providing said gathered information for analysis.

14. The method of claim 11, wherein a processor is configured to provide an inventory of magnetic tape data storage cartridges, identifying active cartridges and a scratch pool, and to identify cartridges that are input into said library; and wherein said method additionally comprises operating said at least one robot accessor to provide said input cartridges to said at least one magnetic tape data storage drive to initiate said diagnostic test of an uninitialized magnetic tape data storage cartridge before said magnetic tape data storage cartridge is added to said inventory scratch pool.

15. A computer program product embodied on at least one computer readable medium, configured to be usable with at least one programmable computer processor to provide diagnostic information regarding magnetic tape in an automated data storage library, said automated data storage library comprising a plurality of storage shelves configured to store magnetic tape data storage cartridges; at least one robot accessor configured to transport said magnetic tape data storage cartridges; at least one cartridge label sensor; and a plurality of magnetic tape data storage drives configured to read and write data with respect to magnetic tape data storage cartridges, and configured to detect and track follow servo tracks on magnetic tape; and at least one library controller configured to operate said at least one robot accessor to transport said magnetic tape data storage cartridges, and to operate said at least one cartridge label sensor to read labels of said magnetic tape data storage cartridges; said computer program product comprising:

computer readable program code causing said at least one programmable computer processor to identify uninitialized magnetic tape data storage cartridges;

computer readable program code causing said at least one programmable computer processor to conduct a diagnostic test of said servo tracks on magnetic tape of said identified magnetic tape data storage cartridge using write criteria for said diagnostic test;

computer readable program code causing said at least one programmable computer processor to log diagnostic information resulting from said diagnostic test employing information read from said label to identify said diagnostic information as that of said magnetic tape data storage cartridge;

computer readable program code causing said at least one programmable computer processor to collect said logged diagnostic information resulting from said diagnostic test at said at least one library controller.

16. The computer program product of claim 15, additionally comprising computer readable program code causing said at least one programmable computer processor to maintain a comprehensive history of diagnostic information resulting from diagnostic tests using write criteria, for a plurality of said identified magnetic tape data storage cartridges.

17. The computer program product of claim 16, additionally comprising computer readable program code causing said at least one programmable computer processor to gather information from said maintained comprehensive history; and provide said gathered information for analysis.

18. The computer program product of claim 15, wherein a processor is additionally configured to provide an inventory of magnetic tape data storage cartridges, identifying active cartridges and a scratch pool, and identifying cartridges that are input into said library; and wherein said computer program product additionally comprises computer readable program code causing said at least one programmable computer processor to operate said at least one robot accessor to provide said input cartridges to said at least one magnetic tape data storage drive to initiate said diagnostic test of an uninitialized magnetic tape data storage cartridge before said magnetic tape data storage cartridge is added to said inventory scratch pool.

\* \* \* \* \*